United States Patent [19]

Jones

[11] Patent Number: 4,640,357
[45] Date of Patent: Feb. 3, 1987

[54] MULTISTEP METHOD FOR VISCOUS HYDROCARBON RECOVERY

[75] Inventor: Lloyd G. Jones, Dallas, Tex.

[73] Assignee: Mobil Oil Corporation, New York, N.Y.

[21] Appl. No.: 774,631

[22] Filed: Sep. 11, 1985

[51] Int. Cl.⁴ .............................................. E21B 43/16
[52] U.S. Cl. ...................................... 166/273; 166/292
[58] Field of Search ............... 166/273, 281, 285, 292, 166/294

[56] References Cited

U.S. PATENT DOCUMENTS

| | | | |
|---|---|---|---|
| Re. 29,716 | 8/1978 | Clampitt et al. | 166/294 |
| 3,244,228 | 4/1966 | Parrish | 166/9 |
| 3,525,395 | 8/1970 | Chew | 166/263 |
| 3,525,396 | 8/1970 | Chew | 166/263 |
| 3,845,822 | 11/1974 | Clampitt et al. | 166/281 |
| 3,981,363 | 9/1976 | Gall | 166/294 |
| 4,343,363 | 8/1982 | Norton et al. | 166/281 |
| 4,475,593 | 10/1984 | Friedman | 166/281 |

*Primary Examiner*—Stephen J. Novosad
*Assistant Examiner*—Bruce M. Kisliuk
*Attorney, Agent, or Firm*—Alexander J. McKillop; Michael G. Gilman; George W. Hager, Jr.

[57] ABSTRACT

Hydrocarbons are recovered from a fractured or stratified subsurface formation by means of at least one injection well and at least one production well. A first flooding agent having a high viscosity is injected into the formation to form a filtercake on the walls of the fractures or permeable streaks of the formation only in the near vicinity of the injection well. A second flooding agent having an inorganic thickener is injected deep into the formation to completely fill the thief zones provided by the fractures or permeable streaks of the formation between the injection and production wells. A first flushing agent is then injected to clear the fractures or permeable streaks of the formation only in the near vicinity of the injection well of the inorganic thickener. A second flushing agent having a breaker material is injected to remove the filtercake from the walls of the fractures or permeable streaks of the formation only in the near vicinity of the injection well. A third flooding agent having a low viscosity is injected to flood the reservoir through the open pore spaces made available by the removal of the filtercake near the injection well.

7 Claims, 1 Drawing Figure

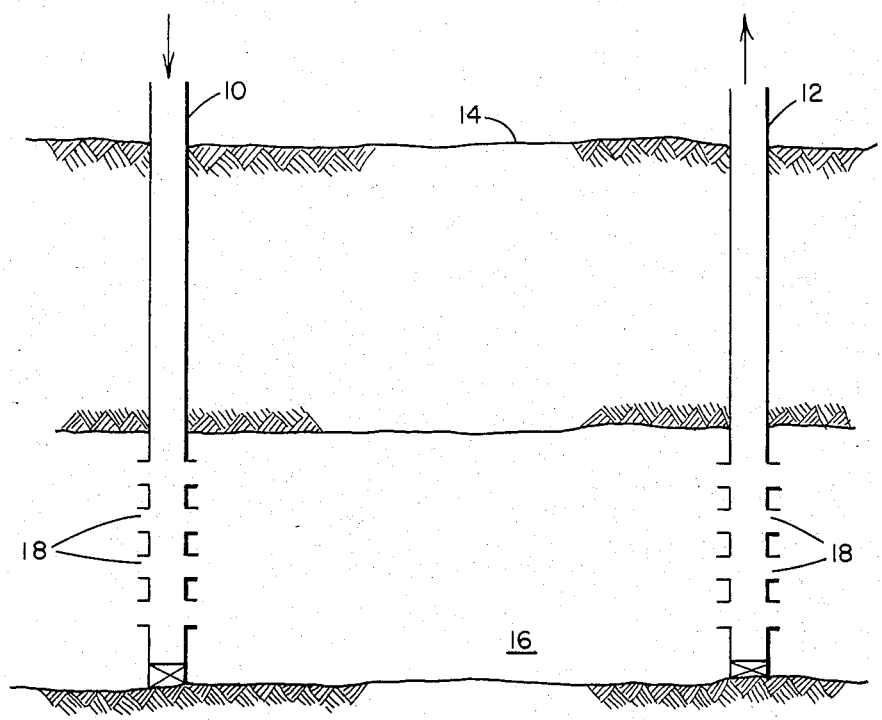

MULTISTEP METHOD FOR VISCOUS HYDROCARBON RECOVERY

BACKGROUND OF THE INVENTION

In the recovery of oil from oil-bearing subsurface formations, it usually is possible to recover only minor portions of the original oil in place by the so-called primary recovery methods which utilize only the natural forces present in the formation. Thus, a variety of supplemental recovery techniques have been employed in order to increase the recovery of oil from subsurface formations. The most widely used supplemental recovery technique is waterflooding which involves the injection of water into an oil-bearing formation. As the water moves through the formation, it acts to displace oil therein to a production system composed of one or more wells through which the oil is recovered.

One difficulty often encountered in waterflooding operations is the relatively poor sweep efficiency of the aqueous flooding agent; that is, the injected aqueous agent tends to channel through certain portions of the formation as it travels from the injection system to the production system and to bypass other portions. Such poor sweep efficiency or macroscopic displacement efficiency may be due to a number of factors, such as differences in the mobilities of the injected aqueous agent and the displaced reservoir oil and permeability variations within the formation which encourage preferential flow through some portions of the formation at the expense of other portions.

Various techniques have been proposed in order to improve the sweep efficiency of the injected aqueous agent and thus avoid premature breakthrough at one or more of the wells comprising the production system. The most widely used procedure involves the addition of thickening agents to the injected aqueous agent in order to increase the viscosity thereof and thus decrease its mobility to a value equal to or less than the mobility of the displaced oil, resulting in a "mobility ratio" of oil to water which is less than or equal to one. Many polymeric thickening agents have been proposed for use in such mobility control operations, see U.S. Pat. Nos. 3,085,063; 3,984,333; 3,969,592; 4,110,232; and 4,222,881.

Another procedure of recovering oil from subsurface oil-bearing formations is disclosed in U.S. Pat. No. 3,224,228 and involves alternately flooding the formation with gas and water. Gas is injected into a watered-out formation or the waterflooded portion of an existing waterflooding operation until a desired gas saturation exists in the reservoir. Water is then injected and the gas-water injection cycles repeated until the water-oil ratio becomes uneconomical. Other alternating gas-water injection methods are described in U.S. Pat. Nos. 3,525,395 and 3,529,396. The theory behind these alternating gas-water injection methods is that the gas would cause relative fluid mobility barriers in the permeable streaks such that the following water could flood out more of the oil zone. The problem with this theory had to do with the injected gas channeling so badly due to its low viscosity that the benefits to oil recovery were limited.

SUMMARY OF THE INVENTION

The present invention is directed to a method for recovering hydrocarbons from fractured or stratified subsurface formations.

A first flooding agent having a high viscosity is injected into the formation to form a filtercake on the walls of the fracture or permeable streaks of the formation only in the near vicinity of the injection well. A second flooding agent having an inorganic thickener is injected deep into the formation to completely fill the thief zones provided by the fractures or permeable streaks of the formation between the injection and production wells. A first flushing agent is then injected to clear the fractures or permeable streaks of the formation only in the near vicinity of the injection well of the inorganic thickener. A second flushing agent having a breaker material is injected for removing the filtercake from the walls of the fractures or permeable streaks of the formation but only in the near vicinity of the injection well. A third flooding agent having a low viscosity is injected to flood the previously unswept formation matrix through the open pore space made available by the removal of the filtercake from the walls of the fractures or permeable streaks of the formation in the near vicinity of the injection well.

In one aspect, a conventional waterflood is carried out wherein each of the first, second and third flooding agents are water. In an alternative aspect, an alternating water-gas flood is carried out wherein said first and second flooding agents are water and said third flooding agent is a miscible gas.

In a further aspect, the first flooding agent contains an organic water thickener, such as a crosslinked polymer. The second flooding agent contains an inorganic thickener. The first flushing agent is water. The second flushing agent contains a breaker, such as an acid. The third flooding agent is unthickened water or a miscible gas, such as carbon dioxide.

BRIEF DESCRIPTION OF THE DRAWING

The drawing depicts a subterranean formation being subjected to the method of the present invention.

DESCRIPTION OF THE PREFERRED EMBODIMENT

Referring to the drawing, subterranean hydrocarbon-bearing formation 14 is penetrated by at least one injection well 10 and at least one spaced-apart production well 12. Both the injection well 10 and the production well 12 are provided with perforations 18 to establish fluid communication with the hydrocarbon-bearing formation 10. Suitable formation flooding fluids are injected into well 10 to enhance hydrocarbon recovery from formation 16. Such hydrocarbon recovery is by way of production well 12.

In flooding highly stratified or fractured formations, the initial flooding often bypasses much of the hydrocarbon (i.e., oil, gas, or condensate) bearing formation matrix because the fractures or other permeable streaks in the reservoir provide preferred paths for the flooding agent to move through the formation. The present invention is directed to a method for blocking off such fractures or permeable streaks except in the vicinity of the injection well whereby the flooding agent is to be diverted through those previously unswept portions of the hydrocarbon bearing formation matrix.

The addition of polymeric thickening agents to injected flooding agents as described in the aforementioned U.S. patents has the advantage of increasing viscosity for blocking the formation fractures and permeable streaks so as to allow the trailing lower viscosity flooding agent to preferentially flood through the previously unswept hydrocarbon-bearing formation matrix. High temperatures often associated with such reservoirs may cause the polymeric thickener to become unstable. On the other hand, some inorganic thickener, such as colloidal alumina or bentonate, will maintain viscosity at such high temperatures. However, such inorganic thickeners are not easily removable from the pore spaces on the walls of the fractures or permeable streaks and, therefore, block off the trailing flooding agent from the previously unswept formation matrix.

It is, therefore, a specific feature of the present invention to provide a method by which an inorganic thickener can be successfully used to block off fractures and permeable streaks between injection and production wells but still allow the trailing flooding agent to penetrate through the pore spaces of the formation matrix in the near vicinity of the injection well for flooding the unswept formation matrix.

In accordance with such invention, a high viscosity thickener is added to a first flooding agent (usually fresh water or brine), which is injected into the formation so that it fills the fractures or permeable streaks only in the near vicinity of the injection well. The nature of the high viscosity thickener is such that it will tend to form a filtercake on the walls of the fractures or permeable streaks in the near vicinity of the injection well. One such high viscosity thickener would be a cross-linked polymer. $ A second flooding agent having an inorganic thickener is then injected deep into the formation to completely fill the thief zones provided by the fractures or permeable streaks between the injection and production wells. A first flushing agent, such as water, is then injected to clear the fractures or permeable streaks only in the near vicinity of the injection well of most of the inorganic thickener, leaving only the polymer filtercake. At this time, a breaker or other chemical agent, such as an acid, is injected along with a second flushing agent so that the filtercake will be removed from the fracture walls, again in the near vicinity of the injection well. One such breaker would be benzoic acid. The step may not be needed, however, if the polymer will break on its own accord. Following filtercake removal, the formation is injected with a third flooding agent, such as water, for flooding the formation matrix through the open pore spaces of the walls of the fractures or permeable streaks from which the filtercake has been removed in the near vicinity of the injection well. This occurs because the inorganic thickener of the second flooding agent plugs off the fractures and permeable streaks and the third flooding agent preferentially floods through the previously unswept hydrocarbon-bearing formation matrix. Or, in the alternating water-gas injection scheme, the formation is flooded with a miscible agent, such as a carbon dioxide gas, following filtercake removal near the injection well to preferentially flood the unswept formation matrix.

While a preferred embodiment of the method of the present invention has been described and illustrated, numerous modifications or alterations may be made without departing from the spirit and scope of the invention as set forth in the appende claims.

I claim:

1. A method for recovering hydrocarbons from a fractured or stratified subsurface formation penetrated by at least one injection well and at least one production well, comprising the steps of:
    (a) injecting a first flooding agent having an organic thickener into said formation only in the near vicinity of the injection well to form a filtercake on the walls of the fractures or permeable streaks of said formation,
    (b) injecting a second flooding agent having an inorganic thickener deep into said formation to fill the thief zones provided by the fractures or permeable streaks between the injection and production wells,
    (c) injecting a first flushing agent into said formation only in the near vicinity of the injection well to clear the fractures or permeable streaks in the near vicinity of the injection well of said inorganic thickener,
    (d) injecting a second flushing agent having a breaker material into said formation only in the near vicinity of the injection well to remove the filtercake from the walls of the fractures or permeable streaks only in the near vicinity of the injection well,
    (e) injecting a third flooding agent into said formation to flood said formation through the open pore space made available by the removal of the filtercake from the walls of the fractures or permeable streaks in the near vicinity of the injection well, and
    (f) recovering hydrocarbons from the formation by way of the production well.

2. The method of claim 1 wherein said organic thickener is a crosslinked polymer.

3. The method of claim 1 wherein said first, second and third flooding agents contain water.

4. The method of claim 1 wherein said first and second flooding agents contain water and said third flooding agent is a miscible gas.

5. The method of claim 4 wherein said miscible gas is carbon dioxide.

6. The method of claim 1 wherein said first flushing agent is water.

7. The method of claim 1 wherein said second flushing agent contains an acid for breaking and removing the filtercake in the near vicinity of the injection well.

* * * * *